United States Patent
Ishihara

(10) Patent No.: US 12,206,133 B2
(45) Date of Patent: Jan. 21, 2025

(54) BATTERY MODULE

(71) Applicant: HONDA MOTOR CO., LTD., Tokyo (JP)

(72) Inventor: Yuya Ishihara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 301 days.

(21) Appl. No.: 17/684,464

(22) Filed: Mar. 2, 2022

(65) Prior Publication Data

US 2022/0285793 A1    Sep. 8, 2022

(51) Int. Cl.
| | |
|---|---|
| *H01M 50/51* | (2021.01) |
| *H01M 10/613* | (2014.01) |
| *H01M 10/6556* | (2014.01) |
| *H01M 10/6568* | (2014.01) |

(52) U.S. Cl.
CPC ......... *H01M 50/51* (2021.01); *H01M 10/613* (2015.04); *H01M 10/6556* (2015.04); *H01M 10/6568* (2015.04)

(58) Field of Classification Search
CPC .......... H01M 10/613; H01M 10/6556; H01M 10/6568; H01M 50/51
See application file for complete search history.

(56) References Cited

U.S. PATENT DOCUMENTS

| | | | |
|---|---|---|---|
| 2003/0151388 A1 | 8/2003 | Shimamura et al. | |
| 2010/0104939 A1 | 4/2010 | Wang et al. | |
| 2010/0196752 A1 | 8/2010 | Yue et al. | |
| 2013/0029198 A1 | 1/2013 | Suzuki | |
| 2015/0111075 A1 | 4/2015 | Yum et al. | |
| 2017/0033332 A1 | 2/2017 | Sakai et al. | |
| 2020/0075267 A1* | 3/2020 | Sawamura | H01M 10/6567 |
| 2021/0288385 A1 | 9/2021 | Jin et al. | |

FOREIGN PATENT DOCUMENTS

| | | |
|---|---|---|
| CN | 101315990 | 12/2008 |
| CN | 101401227 | 4/2009 |
| CN | 201655905 | 11/2010 |

(Continued)

OTHER PUBLICATIONS

Chinese Office Action and Search Report for Chinese Patent Application No. 202210209197.4 dated Nov. 10, 2023.

(Continued)

*Primary Examiner* — Karie O'Neill Apicella
(74) *Attorney, Agent, or Firm* — Amin, Turocy & Watson, LLP

(57) ABSTRACT

A battery module includes a plurality of battery cells connected in series. Each of the battery cells has a rectangular thin plate shape, and includes a thin plate-shaped positive electrode tab and a thin plate-shaped negative electrode tab, which are provided on one side of the battery cell. Among the battery cells, the side of one battery cell where the positive electrode tab and the negative electrode tab are provided and the side of another battery cell where the positive electrode tab and the negative electrode tab are provided, are arranged so as to face each other. The positive electrode tab of the one battery cell and the negative electrode tab of the other battery cell are overlapped with each other in a thickness direction of the battery cells and in contact with each other.

7 Claims, 11 Drawing Sheets

(56) References Cited

FOREIGN PATENT DOCUMENTS

| | | |
|---|---|---|
| CN | 102870252 | 1/2013 |
| CN | 106233502 | 12/2016 |
| CN | 106876651 | 6/2017 |
| CN | 208959324 | 6/2019 |
| CN | 111463496 | 7/2020 |
| CN | 211125715 | 7/2020 |
| JP | 2003-242951 | 8/2003 |
| JP | 2007-157366 | 6/2007 |
| JP | 2008-226519 | 9/2008 |
| JP | 2011-243442 | 12/2011 |
| JP | 2016-119152 | 6/2016 |
| JP | 2016-539456 | 12/2016 |
| WO | 2018/079165 | 5/2018 |
| WO | WO-2018079165 A1 * | 5/2018 .............. H01M 2/10 |
| WO | 2020/055038 | 3/2020 |

OTHER PUBLICATIONS

Japanese Office Action for Japanese Patent Application No. 2021-035402 dated Nov. 19, 2024.

* cited by examiner

BATTERY MODULE

CROSS-REFERENCE TO RELATED APPLICATIONS

This application is based upon and claims the benefit of priority from Japanese Patent Application No. 2021-035402 filed on Mar. 5, 2021, the contents of which are incorporated herein by reference.

BACKGROUND OF THE INVENTION

Field of the Invention

The present invention relates to a battery module.

Description of the Related Art

In the battery module disclosed in JP 2003-242951 A, a plurality of flat batteries are connected in series by connecting electrode lead terminals of the adjacent flat batteries by an electric conductor.

SUMMARY OF THE INVENTION

In the technique disclosed in JP 2003-242951 A, the electrode lead terminals of the adjacent flat batteries are connected to each other by an electric conductor. Therefore, there is a problem that the resistance between the electrode lead terminals increases.

The present invention has been made to solve the above-described problem, and it is an object of the present invention to provide a battery module capable of reducing the resistance of a connecting portion for connecting a plurality of battery cells in series.

According to an aspect of the present invention, there is provided a battery module including a plurality of battery cells connected in series, wherein each of the battery cells has a rectangular thin plate shape, and includes a thin plate-shaped positive electrode tab and a thin plate-shaped negative electrode tab, which are provided on one side of the battery cell; among the battery cells, the side of one battery cell where the positive electrode tab and the negative electrode tab are provided and the side of another battery cell where the positive electrode tab and the negative electrode tab are provided, are arranged so as to face each other; and the positive electrode tab of the one battery cell and the negative electrode tab of the other battery cell are overlapped with each other in a thickness direction of the positive and negative electrode tabs and in contact with each other.

According to the present invention, it is possible to reduce the resistance of the connecting portion for connecting a plurality of battery cells in series.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

First Embodiment

Figure 1:
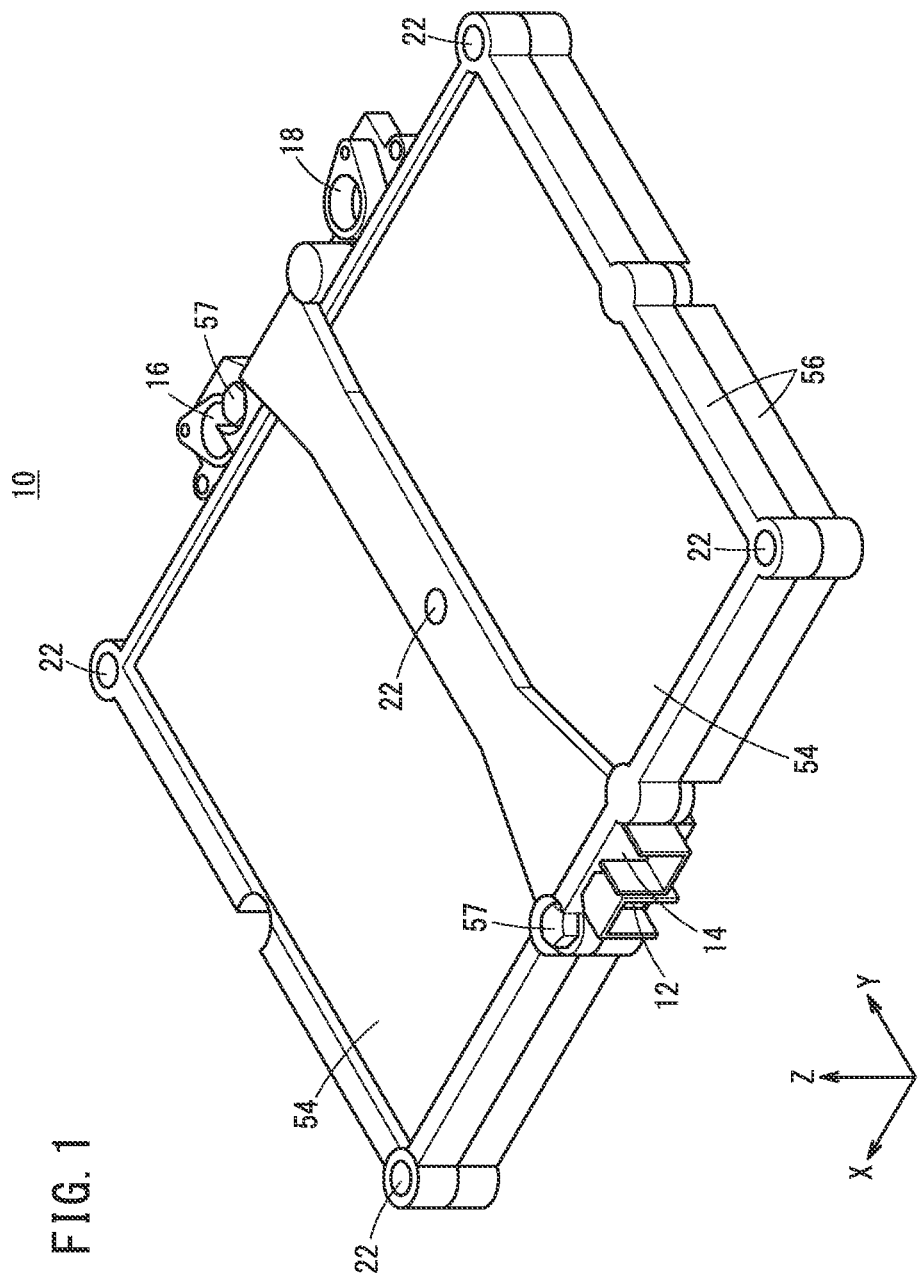
FIG. 1 is a perspective view of a battery module.
Figure 2:
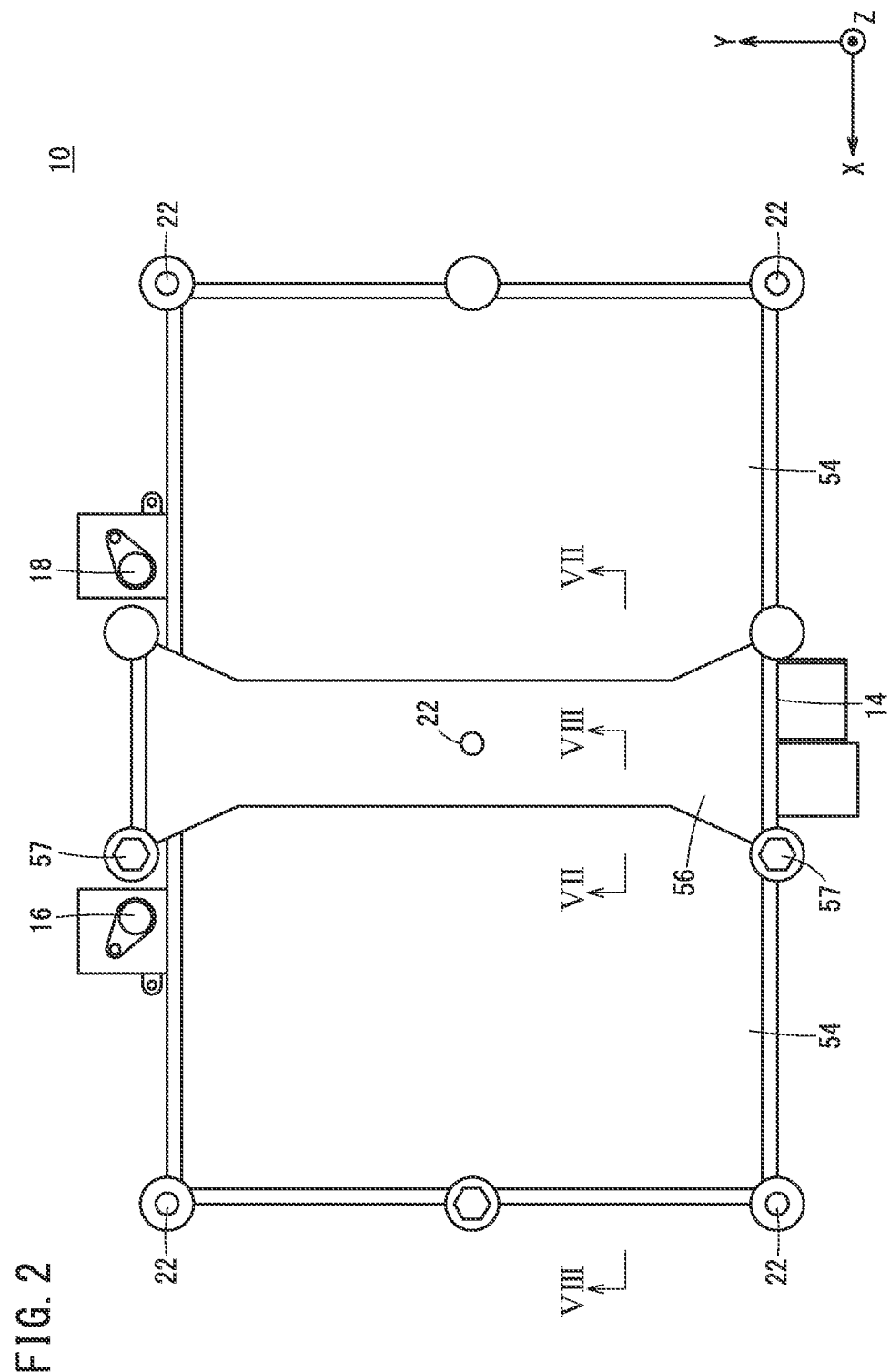
FIG. 2 is a front view of the battery module.
Figure 3:
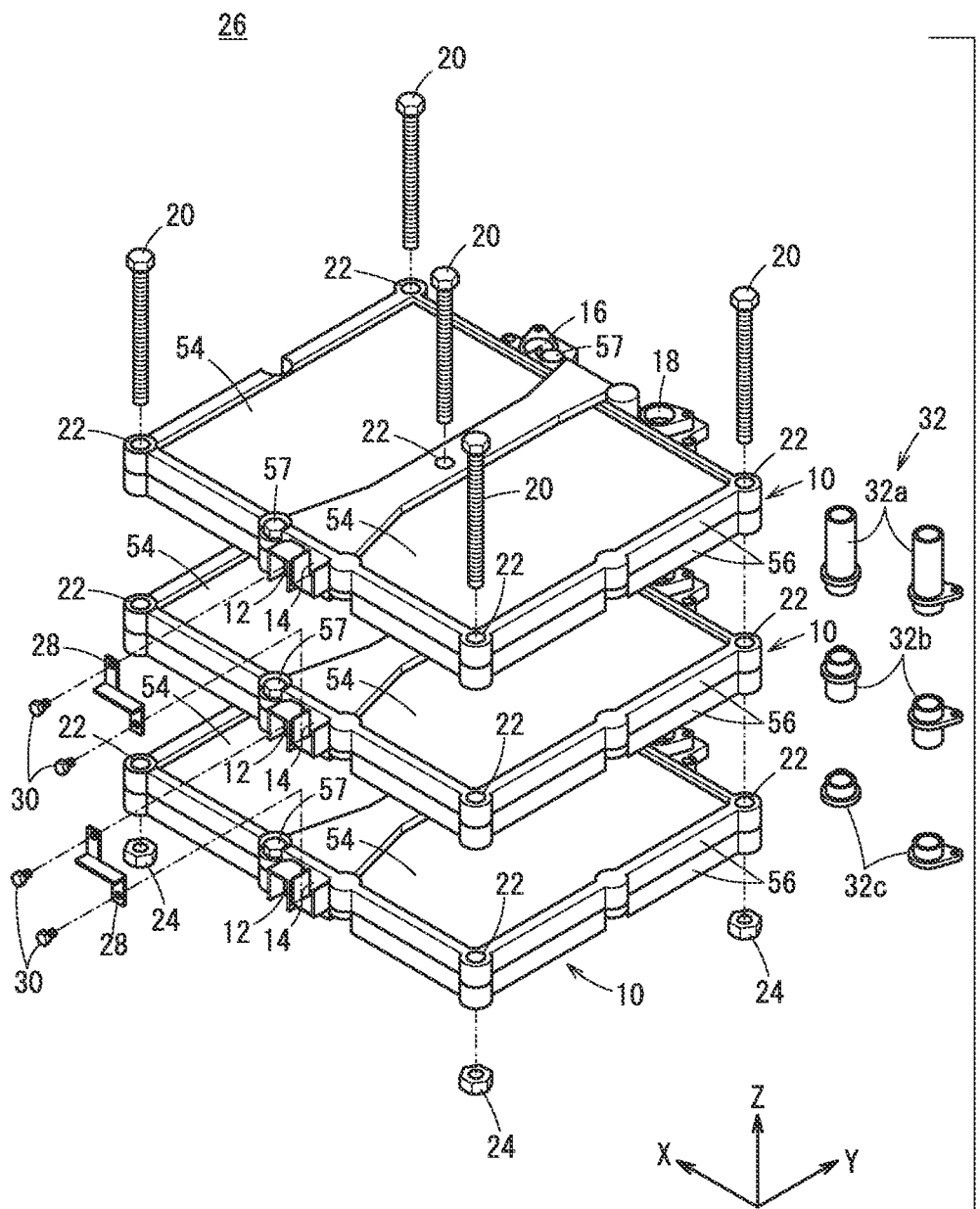
FIG. 3 is an exploded perspective view of a battery pack.
Figure 4:
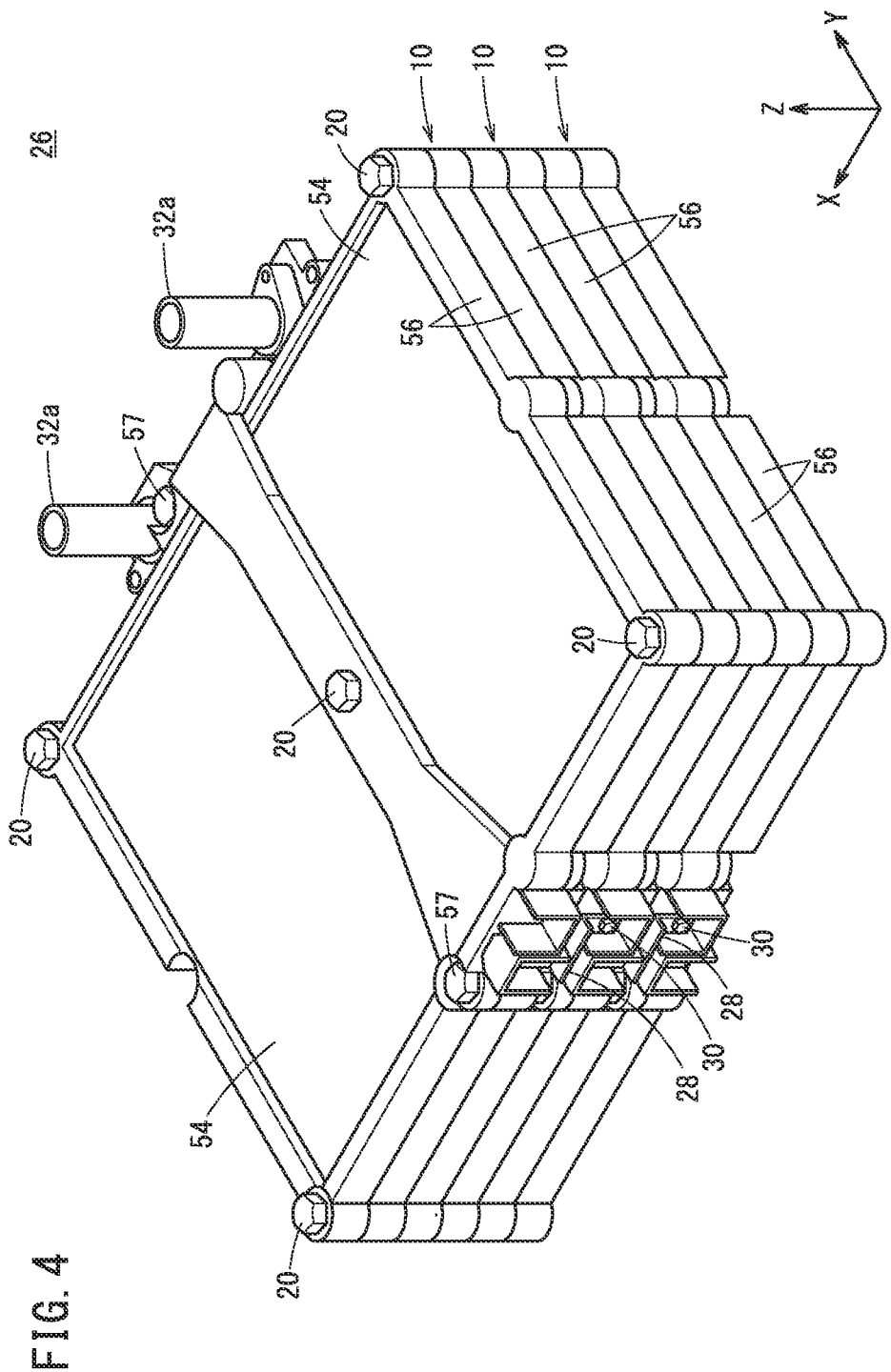
FIG. 4 is a perspective view of the battery pack.

FIG. 1 is a perspective view of a battery module 10 according to the present embodiment. FIG. 2 is a front view of the battery module 10. FIG. 3 is an exploded perspective view of a battery pack 26. FIG. 4 is a perspective view of the battery pack 26. Hereinafter, the direction and orientation in the structure of the battery module 10 will be described using the X axis, the Y axis, and the Z axis shown in FIG. 1. The X-axis, Y-axis, and Z-axis shown in the drawings other than FIG. 1 are described corresponding to the X-axis, Y-axis, and Z-axis in FIG. 1.

As shown in FIGS. 1 and 2, the battery module 10 has a plurality of sides. On a first side of the plurality of sides, there are provided a positive terminal 12 and a negative terminal 14. The first side is located on the negative Y-axis side with respect to the center of the battery module 10. A water supply hole 16 and a drainage hole 18 are provided on a second side of the plurality of sides of the battery module 10. The second side is located on the positive Y-axis side with respect to the center of the battery module 10. The water supply hole 16 and the drainage hole 18 are provided in a water jacket 48 to be described later. The water jacket 48 is provided inside the battery module 10.

As shown in FIG. 3, the battery module 10 includes through holes 22 provided at the four corners and the center portion. Bolts 20 penetrate through the through holes 22. The battery pack 26 comprises three battery modules 10. The three battery modules 10 are fastened by the bolts 20 and nuts 24 in a state of being stacked in the Z-axis direction. Thus, the battery pack 26 shown in FIG. 4 is produced. The positive terminal 12 of one battery module 10 and the negative terminal 14 of another battery module adjacent to the one battery module 10 in the Z-axis direction are connected to each other by a bus bar 28 made of copper. The bus bar 28 is fixed to the positive terminal 12 and the negative terminal 14 by screws 30. Thus, the three battery modules 10 are connected in series.

In the battery pack 26 of the present embodiment, as shown in FIGS. 3 and 4, the three battery modules 10 are stacked in a state in which the positive terminal 12 and the negative terminal 14 of each battery module 10 are arranged in the same direction. Accordingly, the positive terminals 12 and the negative terminals 14 of all the battery modules 10 are located on the same surface of the battery pack 26. The three battery modules 10 may be stacked such that the positive terminal 12 and the negative terminal 14 of each battery module 10 are in different directions. In this case, the positive terminals 12 and the negative terminals 14 of the battery modules 10 are located on different surfaces of the battery pack 26. The positions of the positive terminal 12 and the negative terminal 14 of each battery module 10 in the battery pack 26 can be appropriately changed according to the relationship with other devices or the like located around the battery pack 26.

As shown in FIG. 3, the water supply holes 16 and the drainage holes 18 of the battery modules 10 are connected by aluminum joints 32. The joint 32 includes a first joint 32a, a second joint 32b, and a third joint 32c. The first joint 32a is attached to each of the water supply hole 16 and the drainage hole 18 of a first battery module 10 located on the most positive side in the Z-axis, among the three battery modules 10 constituting the battery pack 26. The second joint 32b is attached to each of the water supply hole 16 and the drainage hole 18 of a second battery module 10 located in the center, among the three battery modules 10 of the battery pack 26. The third joint 32c is attached to each of the water supply hole 16 and the drainage hole 18 of a third battery module 10 located on the most negative side in the Z axis, among the three battery modules 10 of the battery pack 26.

Coolant water injected from the first joint 32a attached to the water supply hole 16 provided in the first battery module 10 is supplied to the water jacket 48 provided in each battery module 10. Then, the coolant water whose temperature has become high as a result of flowing through a coolant water flow path in the water jacket 48 of each battery module 10 is discharged from the first joint 32a attached to the drainage hole 18 of the first battery module 10.

Figure 5:
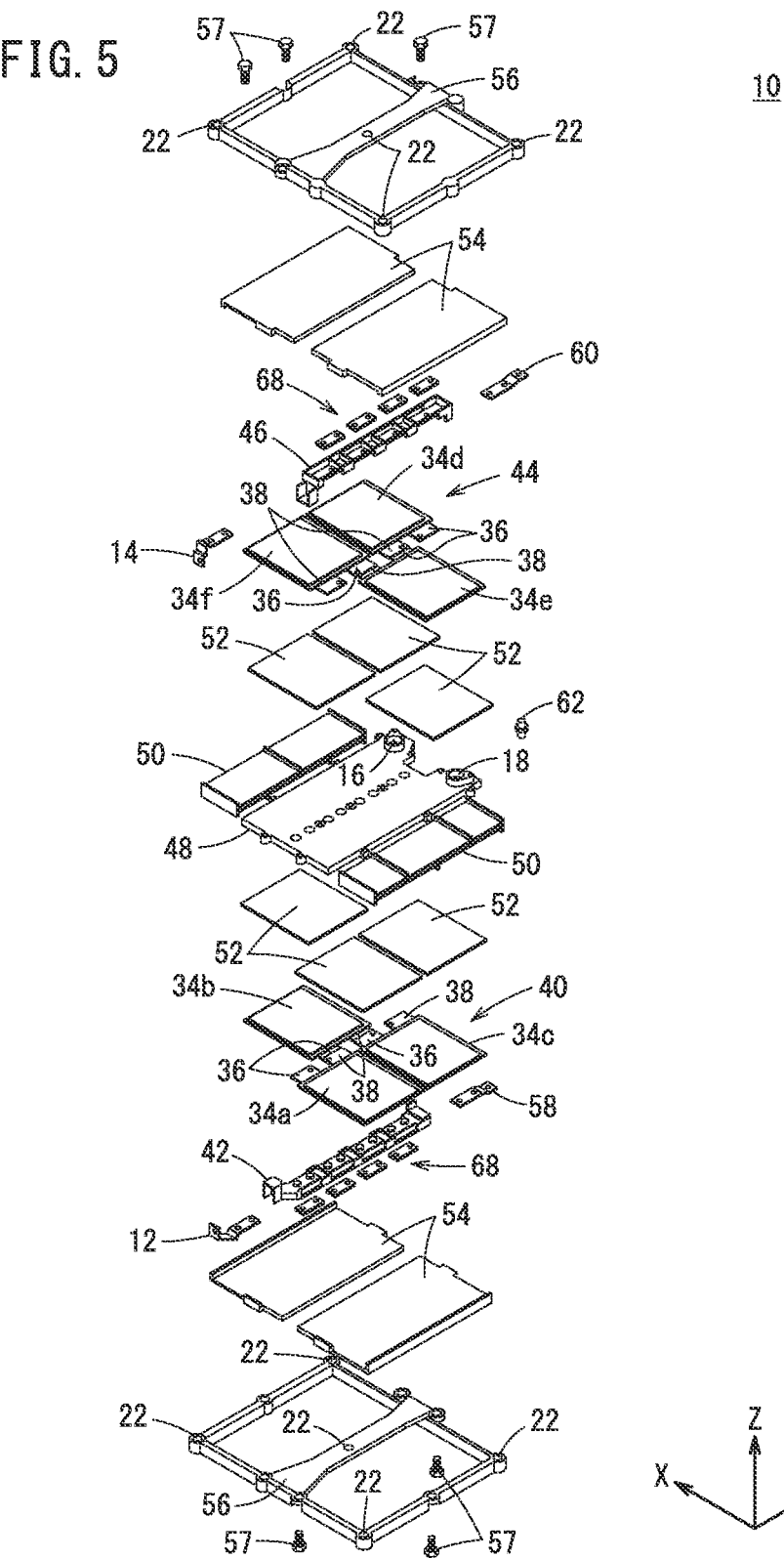
FIG. 5 is an exploded perspective view of the battery module.

FIG. 5 is an exploded perspective view of the battery module 10. The battery module 10 includes a first battery cell 34a, a second battery cell 34b, a third battery cell 34c, a fourth battery cell 34d, a fifth battery cell 34e, and a sixth battery cell 34f connected in series. In the following description, if there is no need to specify any of the first battery cell 34a, the second battery cell 34b, the third battery cell 34c, the fourth battery cell 34d, the fifth battery cell 34e, and the sixth battery cell 34f, they are simply referred to as a battery cell 34 or battery cells 34.

The battery cell 34 is a laminate type lithium ion secondary battery. Each battery cell 34 is formed in a rectangular thin plate shape. Each battery cell 34 is provided with a thin-plate-shaped positive electrode tab 36 and a thin-plate-shaped negative electrode tab 38. The positive electrode tab 36 and the negative electrode tab 38 are provided on the same side.

The first battery cell 34a, the second battery cell 34b, and the third battery cell 34c are connected in series to form a first unit 40. The positive electrode tab 36 and the negative electrode tab 38 of each of the first battery cell 34a, the second battery cell 34b, and the third battery cell 34c are fixed to a terminal 42. The fourth battery cell 34d, the fifth battery cell 34e, and the sixth battery cell 34f are connected in series, to thereby form a second unit 44. The positive and negative electrode tabs 36 and 38 of the fourth battery cell 34d, the fifth battery cell 34e, and the sixth battery cell 34f are fixed to a terminal 46. The fixation of the positive and negative electrode tabs 36 and 38 to the terminals 42 and 46 will be described in detail below.

The water jacket 48 and cell holders 50 are provided between the first unit 40 and the second unit 44. The first unit 40, the second unit 44, the water jacket 48, and the cell holder 50 are stacked in the thickness direction (Z-axis direction) of the battery cell 34. The water jacket 48 is a flat-plate member made of aluminum.

The cell holders 50 made of resin are attached respectively to both sides of the water jacket 48. One cell holder 50 is positioned on the positive X-axis side with respect to the water jacket 48. The other cell holder 50 is positioned on the negative X-axis side with respect to the water jacket 48. The cell holders 50 have an insulating property. An insulating sheet is adhered to the surface of the water jacket 48.

A thermal diffusion sheet 52 is provided for each battery cell 34. Each thermal diffusion sheet 52 is located between the battery cell 34 and the water jacket 48. Each of the thermal diffusion sheets 52 is positioned between the battery cell 34 and the cell holder 50.

A heat insulating material 54 is provided between the first unit 40 and a frame 56. A heat insulating material 54 is provided between the second unit 44 and the frame 56. The frame 56 is made of a resin having insulation property. The heat insulating material 54 is made of a resin having elasticity and insulation property. A frame 56 located on the negative Z-axis side with respect to the water jacket 48 and another frame 56 located on the positive Z-axis side with respect to the water jacket 48 are fastened by bolts 57. Thus, each battery cell 34 is sandwiched by the frames 56 in a state of being sandwiched by the heat insulating materials 54. The heat insulating material 54 is elastically deformed, to thereby be in close contact with each of the battery cells 34. Since pressure from the heat insulating materials 54 acts on each battery cell 34, expansion of each battery cell 34 can be suppressed. The heat insulating material 54 corresponds to an elastic member of the present invention.

Figure 6:
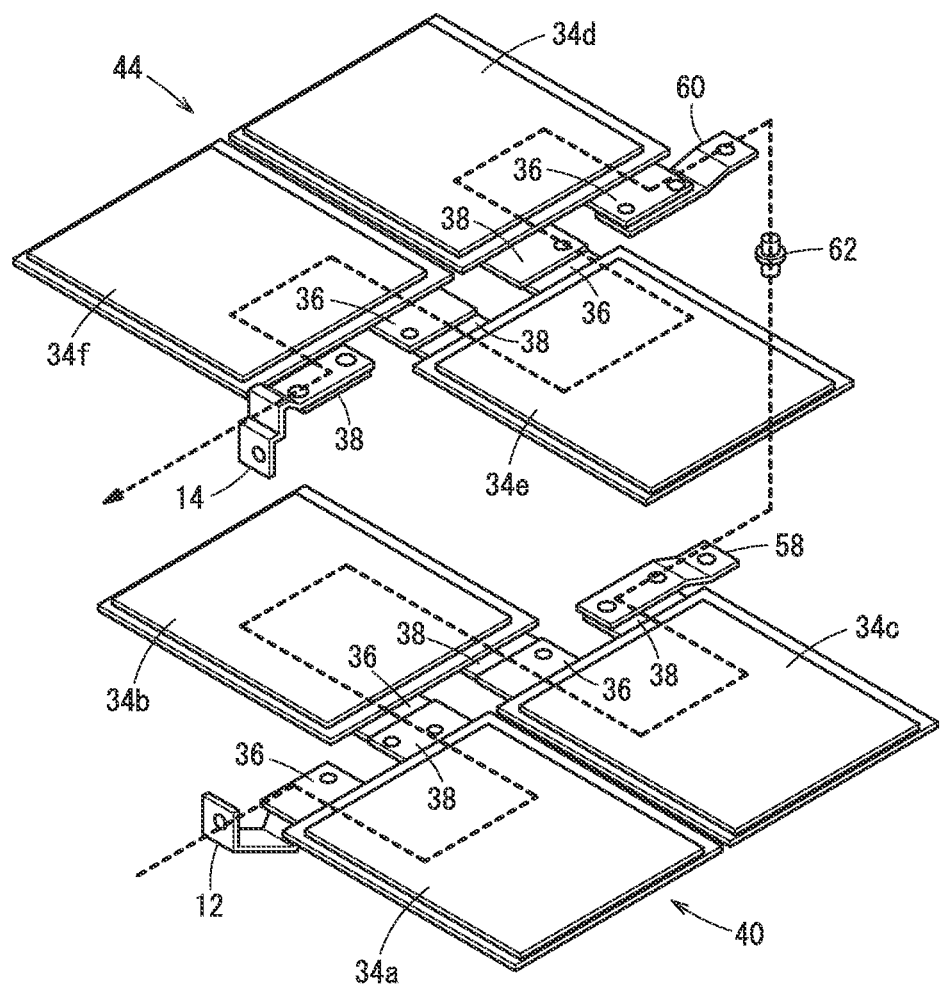
FIG. 6 is a perspective view showing battery cells connected in series.

FIG. 6 is a perspective view showing battery cells 34 connected in series. In FIG. 6, the flow of electric charge is indicated by an arrow.

Among the plurality of battery cells 34 provided in the first unit 40, the first battery cell 34a and the third battery cell 34c are arranged on the negative X-axis side with respect to the center of the first unit 40. The second battery cell 34b of the plurality of battery cells 34 provided in the first unit 40 is arranged on the positive X-axis side with respect to the center of the first unit 40. The first battery cell 34a and the third battery cell 34c are arranged adjacent to each other in the Y-axis direction.

Of the plurality of sides of the first battery cell 34a, a side on which the positive electrode tab 36 and the negative electrode tab 38 are provided is located on the positive X-axis side with respect to the center of the first battery cell 34a. Of the plurality of sides of the second battery cell 34b, a side on which the positive electrode tab 36 and the negative electrode tab 38 are provided is located on the negative X-axis side with respect to the center of the second battery cell 34b. Of the plurality of sides of the third battery cell 34c, a side on which the positive electrode tab 36 and the negative electrode tab 38 are provided is located on the positive X-axis side with respect to the center of the third battery cell 34c.

As a result, the side of the first battery cell 34a on which the positive electrode tab 36 and the negative electrode tab 38 are provided and the side of the second battery cell 34b on which the positive electrode tab 36 and the negative electrode tab 38 are provided face each other. Similarly, the side of the second battery cell 34b on which the positive electrode tab 36 and the negative electrode tab 38 are provided and the side of the third battery cell 34c on which the positive electrode tab 36 and the negative electrode tab 38 are provided face each other.

The positive electrode tab 36 provided on the first battery cell 34a is located on the negative Y-axis side with respect to the center of the first battery cell 34a. The negative electrode tab 38 provided on the first battery cell 34a is located on the positive Y-axis side with respect to the center of the first battery cell 34a. The positive electrode tab 36 provided on the second battery cell 34b is located on the negative Y-axis side with respect to the center of the second battery cell 34*b*. The negative electrode tab 38 provided on the second battery cell 34*b* is located on the positive Y-axis side with respect to the center of the second battery cell 34*b*. The positive electrode tab 36 provided on the third battery cell 34*c* is located on the negative Y-axis side with respect to the center of the third battery cell 34*c*. The negative electrode tab 38 provided on the third battery cell 34*c* is located on the positive Y-axis side with respect to the center of the third battery cell 34*c*.

The negative electrode tab 38 of the first battery cell 34*a* and the positive electrode tab 36 of the second battery cell 34*b* are overlapped with each other in the thickness direction (Z-axis direction) of the positive electrode tab 36 and the negative electrode tab 38 and in contact with each other. The negative electrode tab 38 of the second battery cell 34*b* and the positive electrode tab 36 of the third battery cell 34*c* are overlapped with each other in the thickness direction (Z-axis direction) of the positive electrode tab 36 and the negative electrode tab 38 and in contact with each other.

The fourth battery cell 34*d* and the sixth battery cell 34*f* of the plurality of battery cells 34 provided in the second unit 44 are arranged on the positive X-axis side with respect to the center of the first unit 40. The fifth battery cell 34*e* of the plurality of battery cells 34 provided in the second unit 44 is arranged on the negative X-axis side with respect to the center of the first unit 40. The fourth battery cell 34*d* and the sixth battery cell 34*f* are arranged adjacent to each other in the Y-axis direction.

Of the plurality of sides of the fourth battery cell 34*d*, a side on which the positive electrode tab 36 and the negative electrode tab 38 are provided is located on the negative X-axis side with respect to the center of the fourth battery cell 34*d*. Of the plurality of sides of the fifth battery cell 34*e*, a side on which the positive electrode tab 36 and the negative electrode tab 38 are provided is located on the positive X-axis side with respect to the center of the fifth battery cell 34*e*. Of the plurality of sides of the sixth battery cell 34*f*, a side on which the positive electrode tab 36 and the negative electrode tab 38 are provided is located on the negative X-axis side with respect to the center of the sixth battery cell 34*f*.

As a result, the side of the fourth battery cell 34*d* on which the positive electrode tab 36 and the negative electrode tab 38 are provided and the side of the fifth battery cell 34*e* on which the positive electrode tab 36 and the negative electrode tab 38 are provided face each other. Similarly, the side provided with the positive electrode tab 36 and the negative electrode tab 38, among the plurality of sides of the fifth battery cell 34*e*, and the side provided with the positive electrode tab 36 and the negative electrode tab 38, among the plurality of sides of the sixth battery cell 34*f*, face each other.

The positive electrode tab 36 provided on the fourth battery cell 34*d* is located on the positive Y-axis side with respect to the center of the fourth battery cell 34*d*. The negative electrode tab 38 provided on the fourth battery cell 34*d* is located on the negative Y-axis side with respect to the center of the fourth battery cell 34*d*. The positive electrode tab 36 provided on the fifth battery cell 34*e* is located on the positive Y-axis side with respect to the center of the fifth battery cell 34*e*. The negative electrode tab 38 provided on the fifth battery cell 34*e* is located on the negative Y-axis side with respect to the center of the fifth battery cell 34*e*. The positive electrode tab 36 provided on the sixth battery cell 34*f* is located on the positive Y-axis side with respect to the center of the sixth battery cell 34*f*. The negative electrode tab 38 provided on the sixth battery cell 34*f* is located on the negative Y-axis side with respect to the center of the sixth battery cell 34*f*.

The negative electrode tab 38 of the fourth battery cell 34*d* and the positive electrode tab 36 of the fifth battery cell 34*e* are overlapped with each other in the thickness direction (Z-axis direction) of the positive electrode tab 36 and the negative electrode tab 38 and in contact with each other. The negative electrode tab 38 of the fifth battery cell 34*e* and the positive electrode tab 36 of the sixth battery cell 34*f* are overlapped with each other in the thickness direction (Z-axis direction) of the positive electrode tab 36 and the negative electrode tab 38 and in contact with each other.

The positive terminal 12 made of copper is overlapped on the positive electrode tab 36 of the first battery cell 34*a* of the first unit 40 in the Z-axis direction and in contact therewith. The negative terminal 14 made of copper is overlapped on the negative electrode tab 38 of the sixth battery cell 34*f* of the second unit 44 in the Z-axis direction and in contact therewith.

A bus bar 58 made of copper is superposed on the negative electrode tab 38 of the third battery cell 34*c* of the first unit 40 in the Z-axis direction and in contact therewith. A bus bar 60 made of copper is superposed on the positive electrode tab 36 of the fourth battery cell 34*d* of the second unit 44 in the Z-axis direction and in contact therewith. The bus bars 58 and 60 are connected to each other by an aluminum bus block 62. Thus, the first unit 40 and the second unit 44 are connected in series. In this way, a structure can be achieved in which the first unit 40 and the second unit 44 are arranged so as to be folded back. Thus, the area occupied by the battery cell 34 in the battery module 10 can be suppressed.

Positive charges reaching the first unit 40 via the positive terminal 12 move inside the first unit 40 from the negative Y-axis side toward the positive Y-axis side.

The positive charges that have moved in the first unit 40 reach the second unit 44. The positive charges reaching the second unit 44 move inside the second unit 44 from the positive Y-axis side toward the negative Y-axis side, and exit through the negative terminal 14.

[Structure for Fixing Positive Electrode Tab and Negative Electrode Tab to Terminals]

Figure 7:
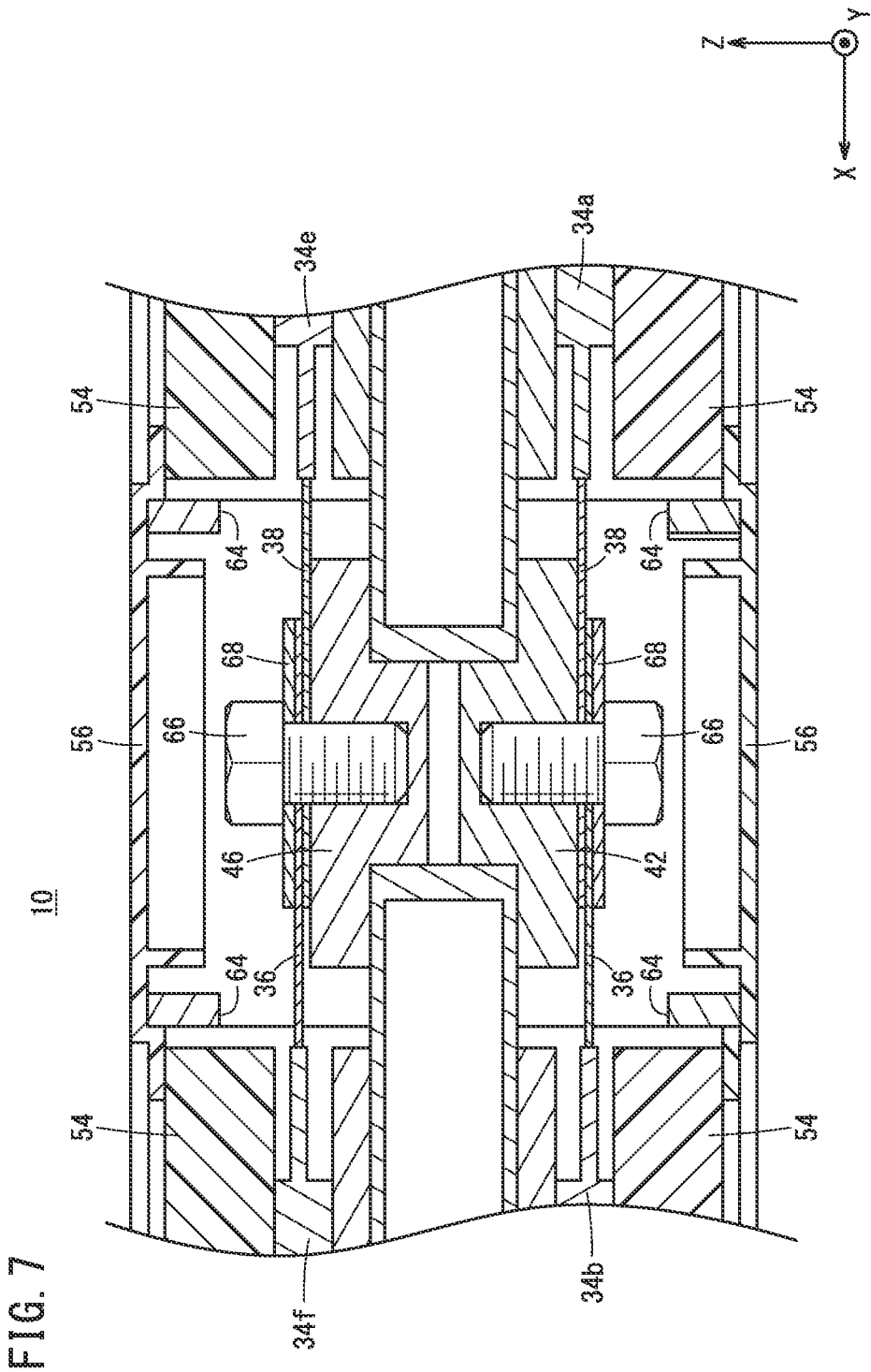
FIG. 7 is a partial sectional view of the battery module.

FIG. 7 is a partial sectional view of the battery module 10. FIG. 7 corresponds to a cross section taken along line VII-VII in FIG. 2.

The terminals 42 and 46 are formed of a resin having insulation property. Each of the terminals 42 and 46 has slits 64, which are provided on respective both sides thereof in the X-axis direction.

The positive electrode tab 36 and the negative electrode tab 38 of the first battery cell 34*a* are inserted into the slit 64 located on the negative X-axis side of the terminal 42. The positive electrode tab 36 and the negative electrode tab 38 of the second battery cell 34*b* are inserted into the slit 64 located on the positive X-axis side of the terminal 42. The positive electrode tab 36 and the negative electrode tab 38 of the third battery cell 34*c* are inserted into the slit 64 located on the negative X-axis side of the terminal 42. The positive electrode tab 36 and the negative electrode tab 38 facing each other in the X-axis direction are overlapped in the Z-axis direction in the terminal 42. In this state, the positive electrode tab 36 and the negative electrode tab 38 are fixed to the terminal 42 by bolts 66. Copper plates 68 are sandwiched respectively between the positive electrode tab 36 and the head of the bolt 66 and between the negative electrode tab 38 and the head of the bolt 66.

The positive electrode tab 36 and the negative electrode tab 38 of the fourth battery cell 34d are inserted into the slit 64 located on the positive X-axis side of the terminal 46. The positive electrode tab 36 and the negative electrode tab 38 of the fifth battery cell 34e are inserted into the slit 64 located on the negative X-axis side of the terminal 46. The positive electrode tab 36 and the negative electrode tab 38 of the sixth battery cell 34f are inserted into the slit 64 located on the positive X-axis side of the terminal 46. The positive electrode tab 36 and the negative electrode tab 38 facing each other in the X-axis direction are overlapped in the Z-axis direction in the terminal 46. In this state, the positive electrode tab 36 and the negative electrode tab 38 are fixed to the terminal 46 by the bolts 66. Copper plates 68 are sandwiched respectively between the positive electrode tab 36 and the head of the bolt 66 and between the negative electrode tab 38 and the head of the bolt 66.

[Cooling Structure of Battery Cell]

Figure 8:
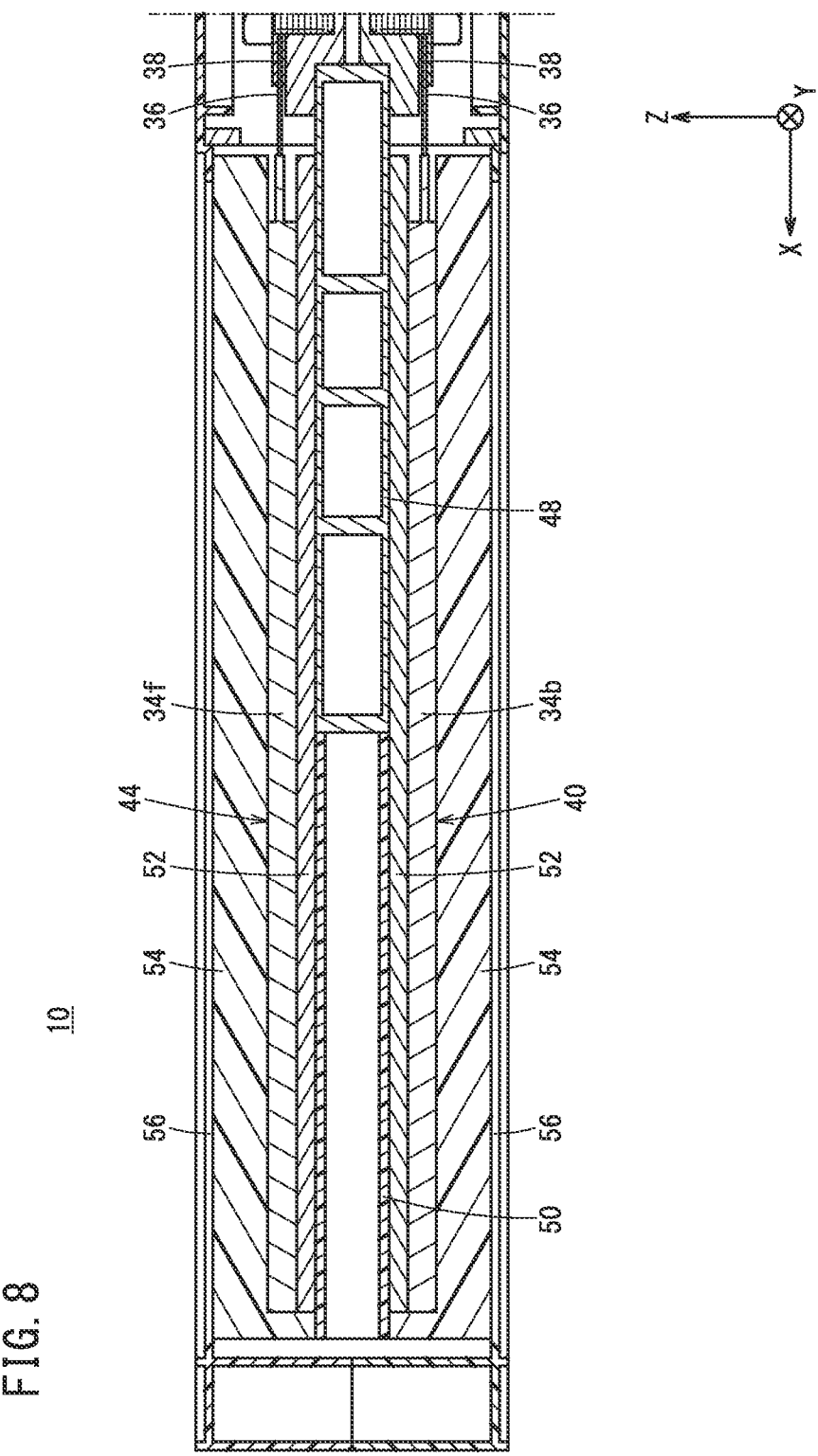
FIG. 8 is a partial sectional view of the battery module.
Figure 9:
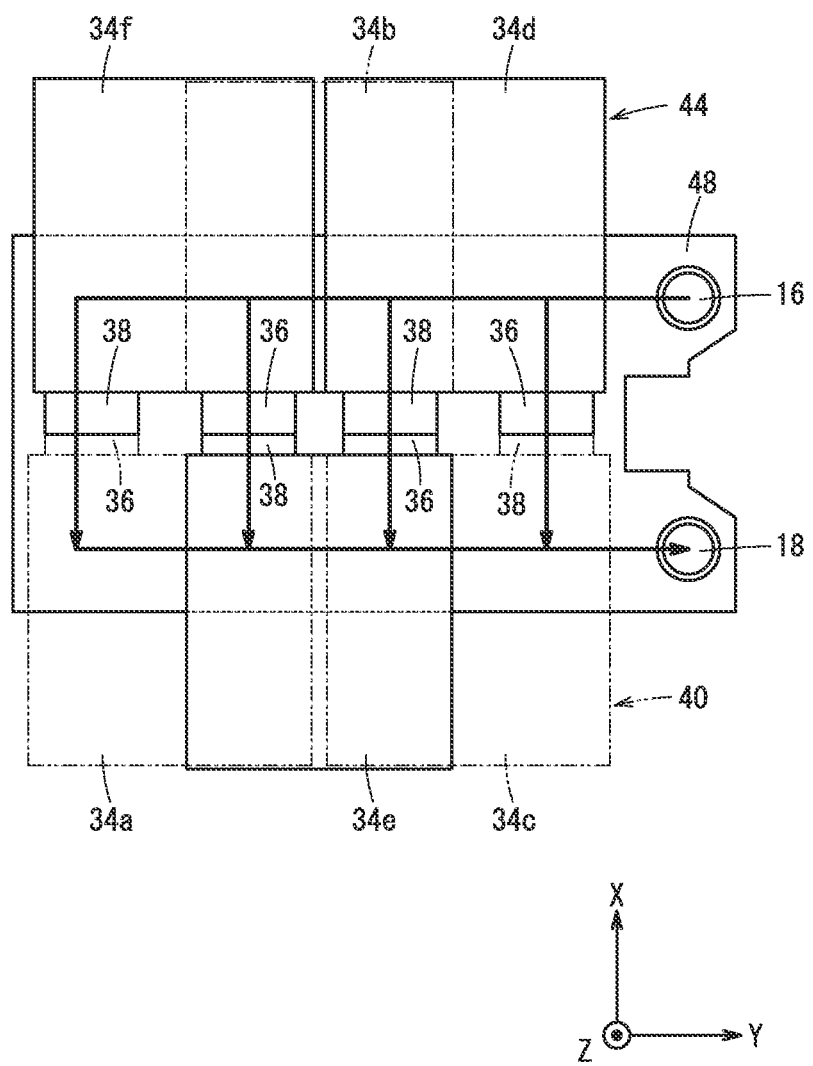
FIG. 9 is a schematic view of a first unit, a second unit, and a water jacket.
Figure 10:
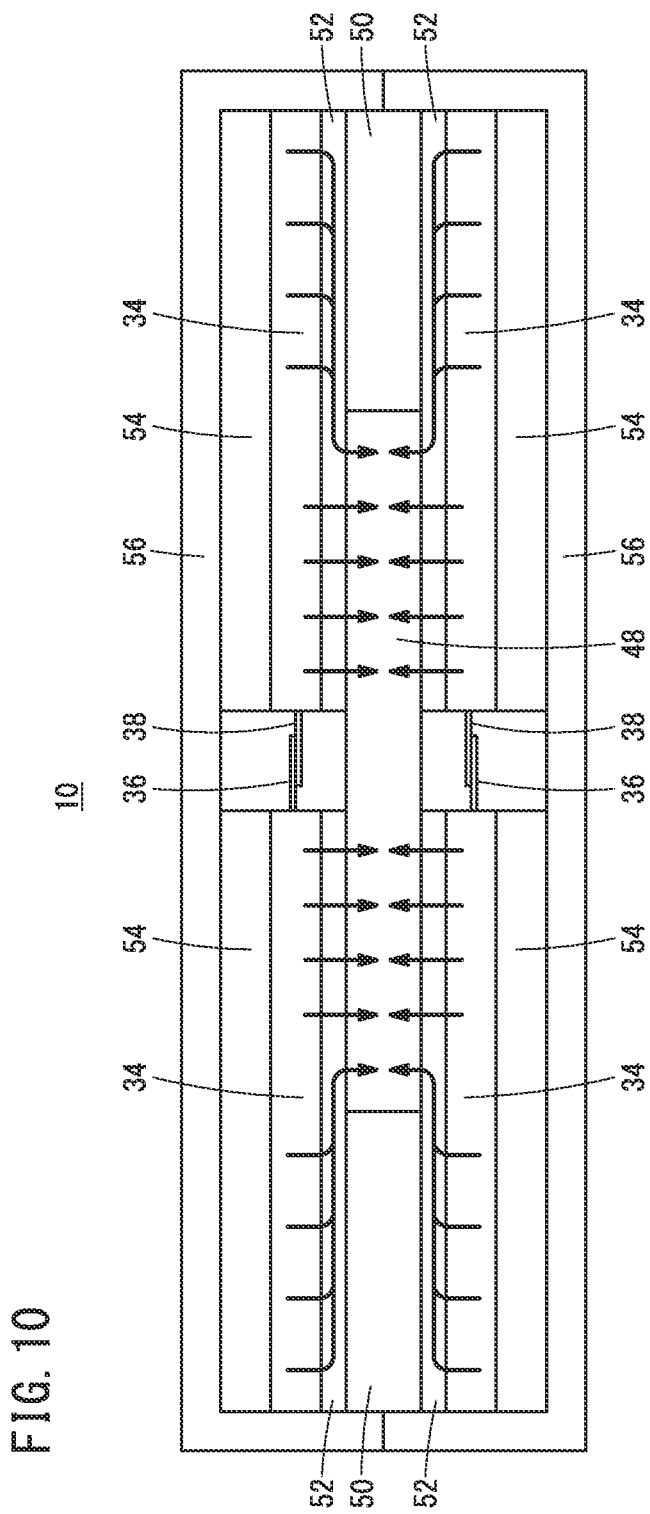
FIG. 10 is a schematic sectional view of the battery module.

FIG. 8 is a partial cross-sectional view of the battery module 10. FIG. 8 corresponds to a cross section taken along line VIII-VIII of FIG. 2. FIG. 9 is a schematic view of the first unit 40, the second unit 44, and the water jacket 48. In FIG. 9, the first unit 40 located on the opposite side of the second unit 44 with the water jacket 48 interposed therebetween is shown by two-dot chain lines. In FIG. 9, the flow of coolant water in the water jacket 48 is indicated by arrows. FIG. 9 shows a state viewed from the positive Z-axis side toward the negative Z-axis side. FIG. 10 is a schematic sectional view of the battery module 10. In FIG. 10, the flow of heat from the battery cell 34 to the water jacket 48 is shown by arrows.

As shown in FIG. 8, the water jacket 48 and the cell holder 50 are each formed in a flat plate shape. The water jacket 48 and the cell holder 50 are sandwiched between the first unit 40 and the second unit 44 in the Z-axis direction. The water jacket 48 is provided at a center portion of the battery module 10 in the X-axis direction. The cell holders 50 are attached to respective both sides of the water jacket 48 in the X-axis direction.

As shown in FIG. 9, in the Z-axis direction, the water jacket 48 overlaps the positive and negative electrode tabs 36 and 38. The water jacket 48 overlaps approximately half the area of each battery cell 34. The coolant water passes through regions within the water jacket 48 corresponding to the positions of the positive and negative electrode tabs 36 and 38, as indicated by arrows in FIG. 9. As indicated by the arrows in FIG. 9, the coolant water passes through a region in the water jacket 48 corresponding to a region of the battery cell 34 that is close to the positive and negative electrode tabs 36 and 38. More specifically, the coolant water passes through a region within the water jacket 48 that corresponds to a substantially half region of the battery cell 34.

As described above, in the present embodiment, in the Z-axis direction, the water jacket 48 overlaps substantially half the area of each battery cell 34. The water jacket 48 may overlap a two-thirds region of each battery cell 34. Alternatively, the water jacket 48 may overlap the entire battery cell 34.

As shown in FIG. 8, a thermal diffusion sheet 52 is provided between each battery cell 34 and the water jacket 48. The thermal diffusion sheet 52 is provided in close contact with the entire surface of the battery cell 34. Heat released from an area of the battery cell 34 that does not overlap the water jacket 48 can be transferred to the water jacket 48 through the thermal diffusion sheet 52. As a result, heat dissipation of the battery cells 34 can be improved (FIG. 10).

The thermal diffusion sheet 52 is made of a resin having elasticity and insulation property. Thus, the thermal diffusion sheet 52 can absorb the tolerance of the battery cells 34 in the stacking direction (Z-axis direction). As described above, when the water jacket 48 overlaps the entire battery cell 34, the thermal diffusion sheet 52 may not be provided.

[Effects]

When the battery cells 34 are connected in series, if the positive electrode tab 36 of the battery cell 34 is connected to the negative electrode tab 38 of another battery cell 34 via a bus bar or the like, there is a problem that the resistance between the positive electrode tab 36 of the battery cell 34 and the negative electrode tab 38 of another battery cell 34 increases.

Therefore, in the battery module 10 of the present embodiment, the positive electrode tab 36 of the battery cell 34 and the negative electrode tab 38 of the other battery cell 34 are overlapped in the thickness direction and are in contact with each other. Thus, since the positive electrode tab 36 of the battery cell 34 is in direct contact with the negative electrode tab 38 of the other battery cell 34, the resistance between the positive electrode tab 36 of the battery cell 34 and the negative electrode tab 38 of the other battery cell 34 can be reduced.

In the battery module 10 of the present embodiment, in each of the first battery cell 34a, the second battery cell 34b, and the third battery cell 34c of the first unit 40, the positive electrode tab 36 is located on the negative Y-axis side, and the negative electrode tab 38 is located on the positive Y-axis side. Further, in each of the fourth battery cell 34d, the fifth battery cell 34e, and the sixth battery cell 34f of the second unit 44, the positive electrode tab 36 is located on the positive Y-axis side, and the negative electrode tab 38 is located on the negative Y-axis side. The first unit 40 and the second unit 44 are stacked in the Z-axis direction and connected in series. This makes it possible to achieve a structure in which the first unit 40 and the second unit 44 are arranged so as to be folded back. Therefore, the area occupied by of the battery cells 34 in the battery module 10 can be suppressed.

In the battery module 10 of the present embodiment, the positive terminal 12 and the negative terminal 14 are provided on the first side of the plurality of sides of the battery module 10. The first side is located on the negative Y-axis side with respect to the center of the battery module 10. Thus, since the positive terminal 12 and the negative terminal 14 can be arranged close to each other, the length of the bus bar 28 connecting the battery modules 10 in series can be shortened, and the resistance of the bus bar 28 can be reduced.

In the battery module 10 of the present embodiment, the water supply hole 16 and the drainage hole 18 are provided on the second side of the plurality of sides of the battery module 10. The second side is located on the positive Y-axis side with respect to the center of the battery module 10. Therefore, the possibility of attachment of the coolant water to the positive terminal 12 and the negative terminal 14 can be reduced, and leakage and short-circuiting can be suppressed.

Further, the battery module 10 of the present embodiment has the flat-plate-shaped water jacket 48 between the first unit 40 and the second unit 44. The water jacket 48 cools each of the plurality of battery cells 34 provided in the first unit 40 and each of the plurality of battery cells 34 provided in the second unit 44, together with the positive electrode tab 36 and the negative electrode tab 38 of each battery cell. Thus, the positive electrode tab 36 and the negative electrode tab 38, which are members having a large amount of heat generation, can be efficiently cooled, and regions of each battery cell 34 close to the positive electrode tab (36) and the negative electrode tab (38), which have a large amount of heat generation, can be also efficiently cooled.

Another Embodiment

Figure 11:
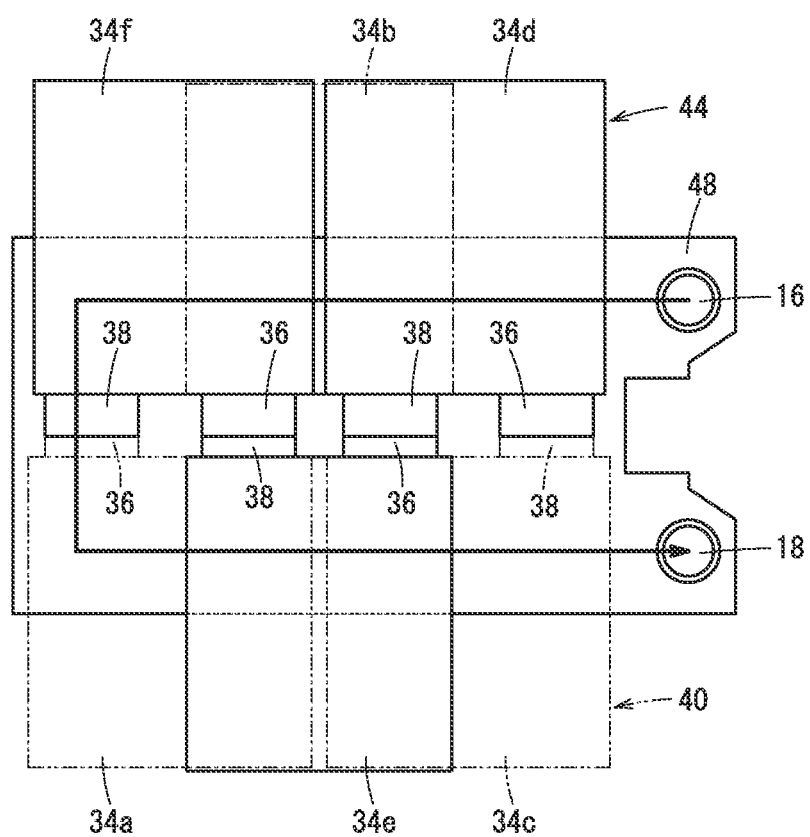
FIG. 11 is a schematic view of the first unit, the second unit, and the water jacket.

FIG. 11 is a schematic view of the first unit 40, the second unit 44, and the water jacket 48. In FIG. 11, the first unit 40 located on the opposite side to the second unit 44 with the water jacket 48 interposed therebetween is shown by two-dot chain lines, and the flow of coolant water in the water jacket 48 is shown by arrows. FIG. 11 shows a state viewed from the positive Z-axis side toward the negative Z-axis side.

In the battery module 10 of the first embodiment, the coolant water passes through regions inside the water jacket 48 corresponding to the positions of the positive electrode tabs 36 and the negative electrode tabs 38, as indicated by the arrows in FIG. 9. In the first embodiment, as indicated by the arrows in FIG. 9, the coolant water passes through regions inside the water jacket 48 corresponding to regions of the battery cells 34 close to the positive and negative electrode tabs 36 and 38. On the other hand, in the other embodiment, as shown in FIG. 11, the coolant water may at least pass through regions within the water jacket 48 corresponding to regions of the battery cells 34 close to the positive and negative electrode tabs 36 and 38.

The battery module 10 according to the first embodiment has six battery cells 34 connected in series. The battery module 10 may have two or more battery cells 34 connected in series.

In the battery module 10 according to the first embodiment, the positive electrode tab 36 and the negative electrode tab 38 of each battery cell 34 are fixed to the terminal 42 or the terminal 46 by the bolts 66. The positive and negative electrode tabs 36 and 38 may be secured to the terminal 42 or 46 in other ways. For example, the terminal 42 or the terminal 46 may be provided with a structure for engaging and locking the elastic member, whereby the positive electrode tab 36 and the negative electrode tab 38 are pressed against and fixed to the terminal 42 or the terminal 46 by the elastic member. Further, the positive electrode tab 36 and the negative electrode tab 38 may be fixed by welding.

Technical Idea Obtained from Embodiments

Technical ideas that can be understood from the above embodiments will be described below.

A battery module (10) includes a plurality of battery cells (34) connected in series. Each of the battery cells has a rectangular thin plate shape, and includes a thin plate-shaped positive electrode tab (36) and a thin plate-shaped negative electrode tab (38), which are provided on one side of the battery cell. Among the battery cells, the side of one battery cell where the positive electrode tab and the negative electrode tab are provided and the side of another battery cell where the positive electrode tab and the negative electrode tab are provided, are arranged so as to face each other. The positive electrode tab of the one battery cell and the negative electrode tab of the other battery cell are overlapped with each other in a thickness direction of the positive and negative electrode tabs and in contact with each other.

The above battery module may further include: a first unit (40) in which the plurality of battery cells are connected in series in a manner that the positive electrode tab of each of the battery cells is located on one side in a width direction of the battery cell and the negative electrode tab is located on another side in the width direction; and a second unit (44) in which the plurality of battery cells are connected in series in a manner that the positive electrode tab of each of the battery cells is located on the other side in the width direction and the negative electrode tab is located on the one side in the width direction. The first unit and the second unit may be stacked in a thickness direction of the battery cells. The negative electrode tab of a battery cell, among the battery cells of the first unit, that is located farthest to the other side and the positive electrode tab of a battery cell, among the battery cells of the second unit, that is located farthest to the other side, may be connected.

The battery module may have a positive terminal (12) and a negative terminal (14) on the one side in the width direction.

The battery module may further include a flat plate-shaped water jacket (48) provided between the first unit and the second unit and containing therein a coolant water flow path. The water jacket may be configured to cool the battery cells of both the first unit and the second unit, including the positive and negative electrode tabs.

The battery module may include a water supply hole (16) and a drainage hole (18) of the coolant water flow path, on the other side.

In the battery module described above, the battery cells may be sandwiched by elastic members (54) in the thickness direction of the battery cells.

The present invention is not particularly limited to the embodiment described above, and various modifications are possible without departing from the essence and gist of the present invention.

What is claimed is:

1. A battery module comprising a plurality of battery cells connected in series,
further comprising a first unit in which a portion of the plurality of battery cells are arranged in a width direction of a battery cell of the portion of the plurality of battery cells while each of the plurality of battery cells is connected in series,
wherein
each of the battery cells has a rectangular thin plate shape, and includes a thin plate-shaped positive electrode tab and a thin plate-shaped negative electrode tab, which are provided on one side of the battery cell,
among the battery cells, the side of one battery cell where the positive electrode tab and the negative electrode tab are provided and the side of another battery cell where the positive electrode tab and the negative electrode tab are provided, are arranged so as to face each other, and
the positive electrode tab of the one battery cell and the negative electrode tab of the other battery cell are overlapped with each other in a thickness direction of the positive and negative electrode tabs and in contact with each other.

2. The battery module according to claim 1, wherein the portion of the plurality of battery cells is a first portion, and wherein the battery module further comprises:
a second unit in which a second portion of the plurality of battery cells are arranged in a width direction of a battery cell of the second portion of the plurality of battery cells while each of the plurality of battery cells is connected in series, wherein in the first unit, the first portion of the plurality of battery cells are connected in series in a manner that the positive electrode tab of each of the battery cells is located on one side in a width direction of the battery cell and the negative electrode tab is located on another side in the width direction; and in the second unit, the second portion of the plurality of battery cells are connected in series in a manner that the positive electrode tab of each of the battery cells is located on the other side in the width direction and the negative electrode tab is located on the one side in the width direction, wherein the first unit and the second unit are stacked in a thickness direction of the battery cells, and the negative electrode tab of a battery cell, among the battery cells of the first unit, that is located farthest to the other side and the positive electrode tab of a battery cell, among the battery cells of the second unit, that is located farthest to the other side, are connected.

3. The battery module according to claim 2, further comprising:

a positive terminal and a negative terminal on the one side in the width direction.

4. The battery module according to claim 2, further comprising:

a flat plate-shaped water jacket provided between the first unit and the second unit and containing therein a coolant water flow path, wherein the water jacket is configured to cool the battery cells of both the first unit and the second unit, including the positive and negative electrode tabs.

5. The battery module according to claim 4, further comprising:

a water supply hole and a drainage hole of the coolant water flow path, on the other side.

6. The battery module according to claim 1, wherein the battery cells are sandwiched by elastic members in a thickness direction of the battery cells.

7. The battery module according to claim 2, further comprising a connecting member that connects a bus bar and another bus bar with each other in a conductive manner, wherein the bus bar is connected to the negative electrode tab of the battery cell, among the battery cells of the first unit, that is located farthest to the other side, the another bas bur is connected to the positive electrode tab of the battery cell, among the battery cells of the second unit, that is located farthest to the other side.

* * * * *